Aug. 3, 1943.    J. K. HODNETTE ET AL    2,326,031
PROTECTIVE DEVICE FOR ELECTRICAL APPARATUS AND SYSTEMS
Filed May 20, 1942    2 Sheets-Sheet 2
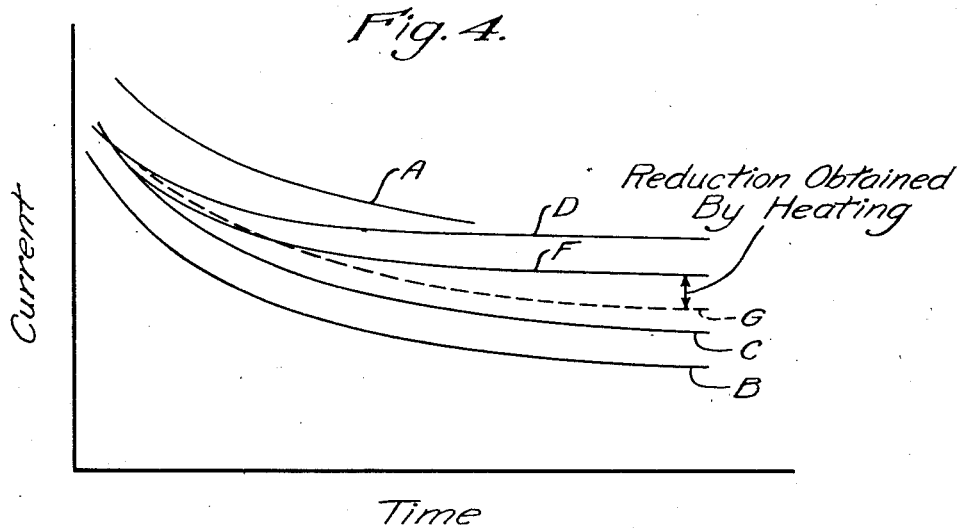
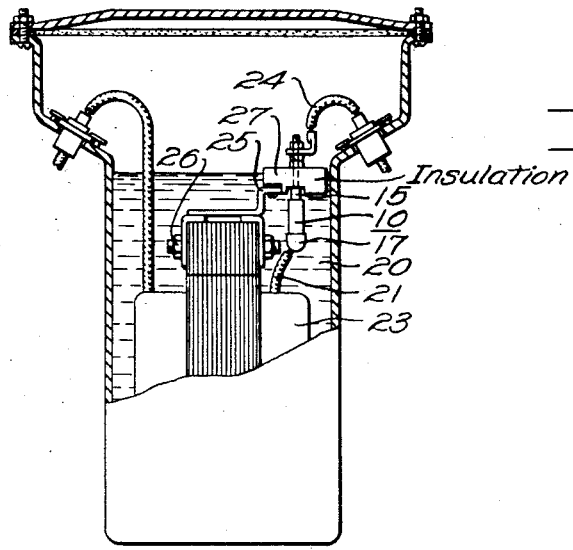
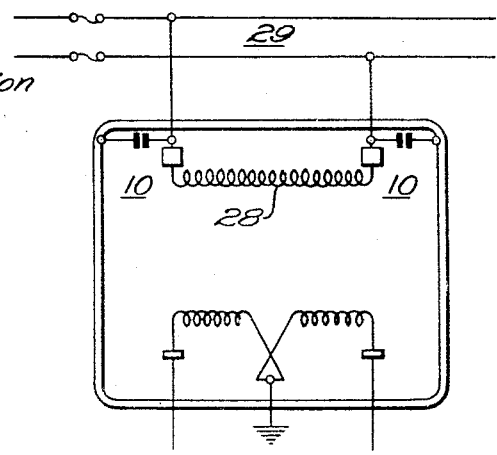
WITNESSES:
Robert C. Baird
Wm. C. Groome
INVENTORS.
John K. Hodnette and
Merrill G. Leonard.
BY
Ezra W. Savage
ATTORNEY Patented Aug. 3, 1943

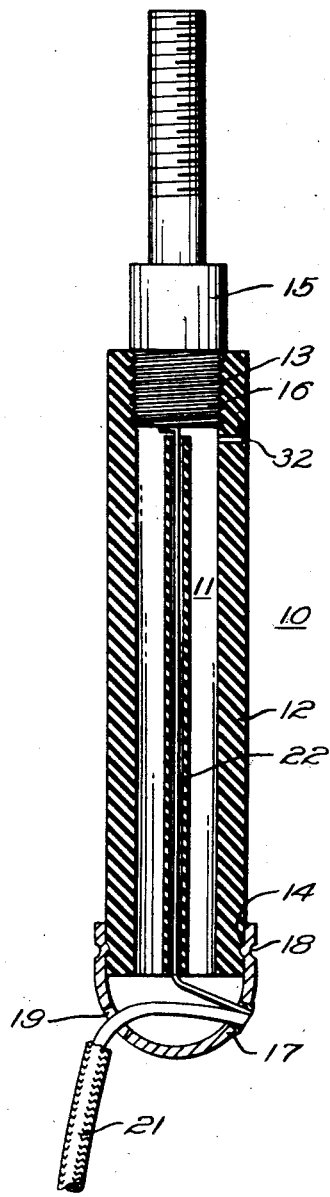
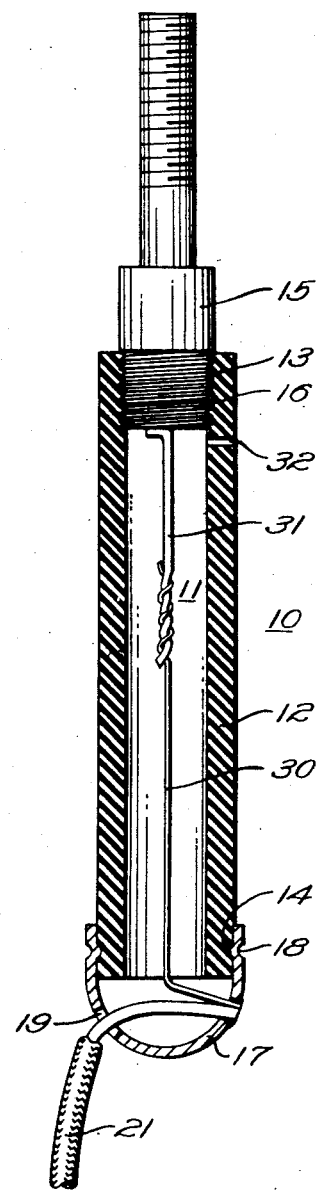
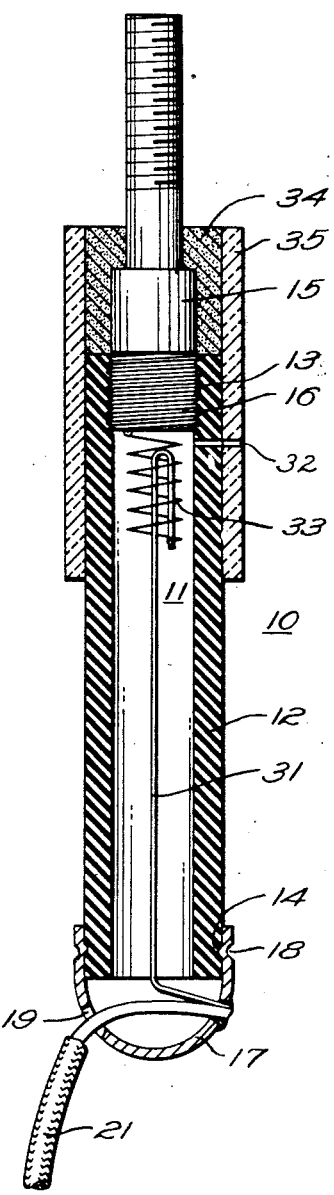

2,326,031

UNITED STATES PATENT OFFICE 2,326,031

PROTECTIVE DEVICE FOR ELECTRICAL APPARATUS AND SYSTEMS

John K. Hodnette and Merrill G. Leonard, Sharon, Pa., assignors to Westinghouse Electric & Manufacturing Company, East Pittsburgh, Pa., a corporation of Pennsylvania Application May 20, 1942, Serial No. 443,690

4 Claims. (Cl. 200—120)

The invention relates generally to protective devices for electrical apparatus and systems, and more particularly, to protective links for protecting electrical apparatus against abnormal voltage and current conditions which may occur in operating apparatus and systems.

The object of the invention is to provide a fusible protective link for electrical apparatus and systems having predetermined time-current characteristics to coordinate it with other protective devices connected in an electrical system, thereby to meet required operating specifications.

The invention, accordingly, is disclosed in the embodiment thereof shown in the accompanying drawings and comprises the features of construction, combination of elements, and arrangement of parts which will be exemplified in the construction hereinafter set forth and the scope of the application of which will be indicated in the claims.

For a fuller understanding of the nature and object of the invention, reference should be had to the following detailed description taken in connection with the accompanying drawings, in which:

Figure 1 is a view, partly in side elevation and partly in section, showing in detail a protective link constructed in accordance with this invention;

Fig. 2 is a view, partly in side elevation and partly in section, showing a modification of the invention;

Fig. 3 is a view partly in side elevation, and partly in section, showing a second modification of the invention;

Fig. 4 is a set of curves showing the time-current characteristics of breakers and fuses such as are provided in electrical systems, and the corresponding curve for the protective link and how they are coordinated to give satisfactory operation;

Fig. 5 is a view, partly in section and partly in side elevation, showing a protective link connected in circuit relation with the windings of a transformer;

Fig. 6 is a diagrammatic view of the windings of a transformer showing how a protective link is connected in circuit relation with the transformer windings; and Fig. 7 is a view in section of a fusible conductor showing heat insulating material applied.

Referring now to the drawings and Fig. 1 in particular, the embodiment of the protective link illustrated comprises a container shown generally at 10 for housing the fusible conductor 11, which will be described in detail hereinafter.

The container 10 comprises a tube 12 made of some suitable material, such as fiber or Micarta both of which have high mechanical strength and are good insulators. The size of the tube will depend on conditions to be met. As shown, the upper end of the tube is provided with an internal thread 13 while the lower end has an external groove 14.

A cylindrical electrode 15, the lower end of which is provided with a thread 16, engages in the internal thread 13 provided in the tube 12. The electrode is made of some suitable conducting material such as copper. In this embodiment of the invention, the electrode is utilized for suspending the protective link in the transformer as illustrated in Fig. 5. However, the protective link may be mounted in any other suitable manner.

The lower end of the tube 12 is closed by a cap 17. As shown, the cap 17 is crimped at 18 to provide an annular member for engaging in the groove 14 in the tube 12 to hold the cap in position. The cap may be made of any suitable conducting material, as for example, copper. An opening 19 is provided in the cap 17 for a purpose to be described hereinafter.

Thus, the container 10 comprises the tube 12, the upper end of which is closed by the electrode 15 and the lower end by the cap 17. The opening 19 in the cap 17 permits the entrance of a dielectric 20 when the protective link is mounted in apparatus such as the transformer illustrated in Fig. 5.

In this embodiment of the invention, the fusible conductor 11 is suspended from the electrode 15. The upper end of the fusible conductor 11 may be connected to the electrode 15 in any well known manner as by brazing or connecting it thereto by a screw threaded into the electrode. As shown, the lower end of the fusible conductor is brazed to the inner side of the cap 17, but it may be connected in any other suitable manner. A conductor 21 which extends through the opening 19 is electrically connected to the fusible conductor 11 at the point where it is brazed to the cap 17.

The fusible conductor may be made of any suitable material having the required fusing characteristics to meet the predetermined operating conditions. In practice, a material sold under the trade-name "Everdur" has been found to be satisfactory. Other suitable high melting point conductors are copper and aluminum. The melting temperature of "Everdur" is well known to the trade and is higher than the cracking temperature of the commonly used liquid dielectrics.

When the protective link is used with electrical apparatus provided with a liquid dielectric, it may be immersed therein as illustrated in Fig. 5. If a body of liquid dielectric is not provided in conjunction with the electrical apparatus, a separate container carrying the necessary volume of liquid dielectric may be provided for the fusible conductor.

When the protective link is immersed as illustrated, the liquid dielectric enters the container 10 through the opening 19. Therefore, heat from the fusible conductor may be dissipated by means of the liquid dielectric. Further, it will be readily appreciated that the size of the tube 12 will, to some extent, control the amount of heat that is dissipated by the dielectric liquid.

It has been found that better control of the dissipation of heat may be effected by mounting on the fusible conductor 11 a small tube 22. A small cambric tube has been found satisfactory. It has also been found that the cambric when at a temperature of the order of an oil cracking temperature will emit gas.

When the protective link is utilized in conjunction with electrical apparatus, such as the transformer illustrated in Fig. 5, it is connected between the windings 23 and the lead wire 24. The protective link 10 may be mounted in any suitable manner, and in the embodiment illustrated is supported on the transformer iron by means of a bracket 25. The bracket may be bolted to the transformer iron as shown at 26. The outer portion of the bracket 27 is made of some suitable material for insulating the protective link from the iron or ground.

As shown in Fig. 6, which is a diagram of the transformer connections, protective links are connected in circuit relation with the high-voltage winding 28, one being connected between each end of the winding and the transmission line 29. In some instances, protective links may be connected in the low-voltage circuit. The number and the location of the protective links connected in circuit relation with the electrical apparatus will depend upon the conditions to be met.

The embodiment of the invention illustrated in Fig. 2 is somewhat similar to that shown in Fig. 1 and described hereinbefore. The main difference resides in the construction of the fusible conductor. As illustrated, the fusible conductor shown generally at 11 comprises a section 30 made from some high melting point material such as Everdur or copper while the section 31 is made from a low melting point material such as tin or a tin alloy. The two sections 30 and 31 are so proportioned in cross-sectional area that they will fuse in substantially the same time when connected in a circuit as separate units so that there is substantially no heat transfer and subjected to the same fusing current.

The fusible conductor 11 will be connected to the electrode 15 and the cap 17 in the same manner as described in connection with the embodiment of the invention illustrated in Fig. 1. In connecting the sections 30 and 31 to one another, any well-known method may be employed. As shown, the conductors may be twisted around one another so as to make good electrical and thermal contact.

A small opening 32 is provided in the upper end of the tube 12 to permit the escape of gas evolved during operation. This opening may be made so small that it will not greatly affect the accumulation of gas in the container 10 when the temperature of the fusible conductor rises above the cracking temperature of the dielectric liquid in which the protective link is immersed. The escape of the gas through the opening 32 will be slow while gas will be evolved at a rapid rate when the fusible conductor 11 reaches the cracking temperature.

In operation if the conditions which cause the generation of gas from the dielectric stop then the gas will slowly escape through the opening 32. This permits the dielectric liquid to enter the container and restore normal heat exchange conditions.

The embodiment of the invention illustrated in Fig. 3 employs still another type of fusible conductor 11. In this instance, the section of the fusible conductor having a low melting temperature is disposed in the lower end of the container 10. The section made from material having a high melting temperature is made in the form of a grid and so disposed that it will transmit a considerable amount of the heat generated in it by the flow of current to the section 31 made from a material having a low melting temperature. It will be readily appreciated that the grid 33 may be made in any suitable shape to effect a predetermined transfer of heat to the section 31. In this embodiment of the invention, a sealing material 34 is applied around the electrode 15 and retained in position by means of a sleeve 35.

In both of the modifications illustrated in Figs. 2 and 3, a cambric tube such as 22 applied in Fig. 1 may be employed in order to cooperate in controlling the dissipation of heat from the fusible conductor 11. In some instances, in order to restrict the dissipation of heat, a thermal insulating material, such as glass cloth 36, may be applied to the fusible conductor 11.

In selecting the component parts of the fusible conductor 11, standard curve sheets prepared for the different sizes of Everdur, copper, tin and tin alloy conductors may be utilized. The method of selecting the proper size of conductor for a particular piece of apparatus is well described in the Patent 2,223,726 granted to J. K. Hodnette, December 3, 1940, and will not be described in detail herein. When a fusible conductor is selected in this manner a protective link may be provided which will afford the necessary protection for electrical appartus of known rating.

In operation, when the fusible conductor is subjected to a current which is higher than that which the apparatus being protected is rated to carry the temperature will begin to rise. When the current value is great enough to raise the temperature of the fusible conductor to the cracking temperature of the dielectric liquid, gases will be evolved which will gradually force the dielectric out of the cambric tube 22 illustrated in Fig. 1. When the dielectric has been completely forced out of the cambric tube, the fusible conductor 11 will be surrounded by a gas layer which constitutes good thermal insulation. The result is that the temperature of the fusible conductor surrounded by a heat insulating medium will rise more rapidly than when in intimate contact with the dielectric liquid which absorbs heat from the fusible conductor and dissipates it rapidly. In this manner, the time-current characteristic of the fusible conductor encased in the cambric tube may be considerably changed from that of a fusible conductor such as Everdur or copper suspended in a dielectric.

The time-current characteristic of a fusible conductor, such as illustrated in Fig. 2 is somewhat different from that illustrated in Fig. 1. The modification in Fig. 3 has still a different time current curve from that of Fig. 2.

The curves of Fig. 4 will now be described to show how the protective link may be coordinated with the other protective devices provided in conjunction with the electrical apparatus. The curve A was selected as representing the trip-time characteristic for a feeder circuit breaker provided in a system, in which a transformer to be protected is connected. The curve B represents the trip-time characteristic of a breaker provided in the transformer, as, for example, the type of breaker utilized in the CSP transformer manufactured by the Westinghouse Electric & Manufacturing Company and sold widely to the trade. In providing a protective link for disconnecting a transformer or other apparatus from the line when conditions liable to destroy or damage the windings occur and still have it properly coordinated with the breakers, it should have a time-current characteristic corresponding to the curve C.

Investigation has revealed that Everdur or copper conductors suspended in a dielectric liquid have a time-current characteristic corresponding to the curve D. A protective link having such a time-current characteristic is not properly coordinated with the breakers and other protective devices in the system. In order to get better coordination, it is necessary to produce a protective link having a time-current characteristic approaching the curve C.

In the structure illustrated in Fig. 2, when the fusible conductor 11 is subjected to a current below the fusing current for some time, heat will be transferred by conduction and convection from the high melting point section 30 to the low melting point section 31. This heat transfer tends to raise the temperature of section 31 and to lower the temperature of section 30.

Assuming now that the fusible member 11 is subjected to an overload current which is not great enough to fuse the low melting point section 31 if connected in a circuit as a separate unit then there will be a distinct rise in temperature of both sections and the high melting point section 30 will be subjected to a much higher rise in temperature than the low melting point section. This will result in a flow of heat from section 30 to section 31 which will effect a rise in the temperature of section 31. If the temperature of the high melting point section 30 is maintained at a temperature above the fusing temperature of the low melting point section for a predetermined time the heat transfer will raise the temperature of the low melting point section 31 to the fusing temperature. In this manner the fusible conductor 11 is given the time-current characteristic illustrated by curve F of Fig. 4.

A greater change in the time-current characteristic curve is obtained with a protective link such as disclosed in Fig. 3. In this instance, the heat transfer from the high melting point section 33 which is made in the form of a grid to the low melting point section 31 is more rapid and a greater heat transfer is effected. The result is that the low melting point section 31 is raised to a temperature during normal operation as is the low melting point section 31 in the modification illustrated in Fig. 2. Therefore, when the protective link of the modification illustrated in Fig. 3 is subjected to a fusing current, the time-current characteristic curve will take the form of that shown in dotted lines and identified as G. It will be noted that the curve G conforms very closely to the curve C which is the ideal curve for coordination with the curves A and B. Therefore, the curves D, F and G are good examples of the coordination that may be effected with the three modifications of the invention disclosed in Figs. 1, 2 and 3.

Since certain changes may be made in the above article and different embodiments of the invention could be made without departing from the scope thereof, it is intended that all matter contained in the above description or shown in the accompanying drawings shall be interpreted as illustrative and not in a limiting sense.

We claim as our invention:

1. In a protective device for electrical apparatus provided with electrical windings, in combination, a fusible conductor, comprising a plurality of sections of different materials having different melting temperatures connected in circuit relation with the electrical windings, one section of the fusible conductor being of a material having a high melting temperature and another section of a material having a low melting temperature, the fusible conductor section of a high melting temperature and the fusible conductor section of a low melting temperature being connected in series circuit relation and so proportioned in cross-sectional area that they will fuse at approximately the same time when subjected to the same fusing current, a container for the fusible conductor, a dielectric liquid into which the container extends, the container having an opening in the lower end to permit entrance of the dielectric liquid, and an opening in the upper end to permit the escape of gases formed by the cracking of the dielectric liquid, the container serving to collect the gas evolved from the dielectric liquid to provide a heat insulating medium surrounding the fusible conductor, the dielectric liquid and container thereby cooperating to control the dissipation of heat from the fusible conductor.

2. In a protective device for electrical apparatus provided with electrical windings, in combination, a fusible conductor connected in circuit relation with the electrical windings, the fusible conductor comprising a plurality of sections of different materials having different melting temperatures, one section of the fusible conductor being made of a material having a low melting temperature, another section of the fusible conductor being made of a material having a high melting temperature, the two sections being connected in series circuit relation and so proportioned that they melt at about the same time when subjected to the same fusing current, the section of material of high melting temperature being so disposed as to constitute a heating grid for the section of the fusible conductor having a low melting temperature, whereby heat transfer from one section of the fusible conductor to the other is quickly effected, a liquid dielectric in which the fusible conductor is immersed, a container for the fusible conductor, the container having an opening at the lower end to permit the entrance of the liquid dielectric and an opening at the upper end to permit the escape of gas evolved by the cracking of the liquid dielectric, the container serving to collect the gases evolved to provide a heat insulating medium around the fusible conductor, the liquid dielectric and container thereby cooperating to control the rate of temperature rise of the fusible conductor.

3. In a protective device for electrical systems provided with line fuses, low voltage breakers, and electrical apparatus having windings to be protected, in combination, a fusible conductor having predetermined fusing characteristics, the fusible conductor comprising a section of material having a low melting temperature and a section of material having a high melting temperature, the two sections of the fusible conductor being connected in series circuit relation and disposed to effect an interchange of heat and being so proportioned in cross-sectional area that they will fuse in about the same time when subjected to a fusing current to give the protective device a predetermined time-current characteristic, a container for the fusible conductor, a liquid dielectric into which the container extends, the container having an opening in the lower end through which the dielectric liquid may enter, and an opening in the upper end to permit the escape of gases evolved by the cracking of the dielectric liquid when the temperature is raised by the heating of the fusible conductor, the container serving to collect evolved gases to provide a heat insulating medium around the fusible conductor.

4. In a protective device for electrical apparatus provided with electrical windings, in combination, a fusible conductor connected in circuit relation with the electrical windings, the fusible conductor comprising a plurality of sections of different materials having different melting temperatures, one section of the fusible conductor being made of a material having a low melting temperature, another section of the fusible conductor being made of a material having a high melting temperature, the two sections being connected in series circuit relation and so proportioned that they melt at about the same time when subjected to the same fusing current, the two sections of the fusible conductor being so connected to one another as to effect a rapid interchange of heat, a liquid dielectric in which the fusible conductor is immersed, and means provided for confining a body of the liquid dielectric, said means cooperating when the dielectric has been cracked to envelope the fusible conductor in a body of the gas produced by the cracking of the liquid dielectric to predetermine the time-current characteristic of the fusible conductor to coordinate the fuse with the electrical apparatus.

JOHN K. HODNETTE.
MERRILL G. LEONARD.